United States Patent [19]

Menzel

[11] 4,136,891
[45] Jan. 30, 1979

[54] SELF-RELEASING JACK ASSEMBLY

[76] Inventor: Thomas G. Menzel, 156 Santa Rita St., Los Banos, Calif. 93635

[21] Appl. No.: 827,604

[22] Filed: Aug. 25, 1977

[51] Int. Cl.² ............................................. B60D 1/00
[52] U.S. Cl. ................................................... 280/475
[58] Field of Search .............. 280/475, 762, 763, 764, 280/765, 766

[56] References Cited

U.S. PATENT DOCUMENTS

| 2,784,985 | 3/1957 | Schnell | 280/763 |
| 2,865,658 | 12/1958 | Dubuque | 280/765 X |

Primary Examiner—Joseph F. Peters, Jr.
Assistant Examiner—R. Schrecengost
Attorney, Agent, or Firm—J. L. Bohan

[57] ABSTRACT

A self-releasing jack for installation on a trailer tongue that releases upon the application of strong rotational forces applied to the base of the jack when the trailer is inadvertently towed without raising the jack.

5 Claims, 3 Drawing Figures

SELF-RELEASING JACK ASSEMBLY

BACKGROUND OF THE INVENTION

1. Field of Invention.

The present invention relates to devices for supporting the tongue of a towed vehicle while disengaged from the towing vehicle.

2. Description of the prior art.

Towed vehicles, such as, utility trailers, boat trailers, house trailers and the like, are frequently provided with a built-in jack which can raise the trailer hitch off the ball or other attaching means on the towing vehicle. Once raised, the tongue is supported while the trailer is in a stationary location thereby freeing the vehicle for other use.

Such built-in jacks are usually welded or bolted to the tongue and can be raised off the ground to clear the road during travel. In a screw jack, for example, once the trailer is attached to the towing vehicle, the jack handle is rotated until the base of the jack is pulled as high as possible. In order to obtain maximum ground clearance during towing, many devices have been provided for rotating the support, such as, a jack or stand to a more or less horizontal position. This is accomplished by providing means which will hold the jack or stand firmly in position while in the support mode and, in addition, hold the jack or stand firmly in a retracted position out of harm during towing. For example, the device shown in U.S. Pat. No. 3,643,975 issued to William R. Parkhurst on Feb. 22, 1972, shows a locking apparatus for holding the stand in either a vertical or horizontal position. This is accomplished by providing a latch which engages with a notch holding the stand firmly in a vertical position, which latch must then be manually released from the notch while the jack is then rotated to the horizontal position where the latch then engages with a second notch.

This approach of using a latch which engages with notches located in predetermined position is likewise shown in U.S. Pat. No. 2,571,390 issued to S. Strand on Oct. 16, 1951. Again, the stand is held in a vertical position by virtue of a latch firmly engaging with a notch, and in order to move the stand to a horizontal position, the latch must be manually pulled out of the notch to allow the stand to be swung into the horizontal position where a second notch is located allowing one to manually latch the stand at that position. In U.S. Pat. No. 3,273,733 issued on Sept. 20, 1966, to D. H. Schuler, an adjustable jack which is adjustable by means of a screwthread is likewise provided with a latch and notch system for firmly holding the jack in a vertical position. Again, in order to release the jack, the latch must be manually removed from the notch to allow the jack to be rotated out of the way during towing.

The above is exemplary of prior art showing various assemblies for supporting a trailer tongue while the trailer is stationary, but with means provided to allow the supporting assembly to be rotated manually so that it is out of the way during towing.

SUMMARY OF THE INVENTION

A preferred embodiment made in accordance with the principles of the present invention utilizes a mechanical or hydraulic jack mounted on assembly which is bolted or welded to the tongue of a trailer. The jack is fixed to a rotatable member which resists rotation until a strong rotational force is applied, thereby causing the jack to swing away without being bent.

DETAILED DESCRIPTION

Figure 1:
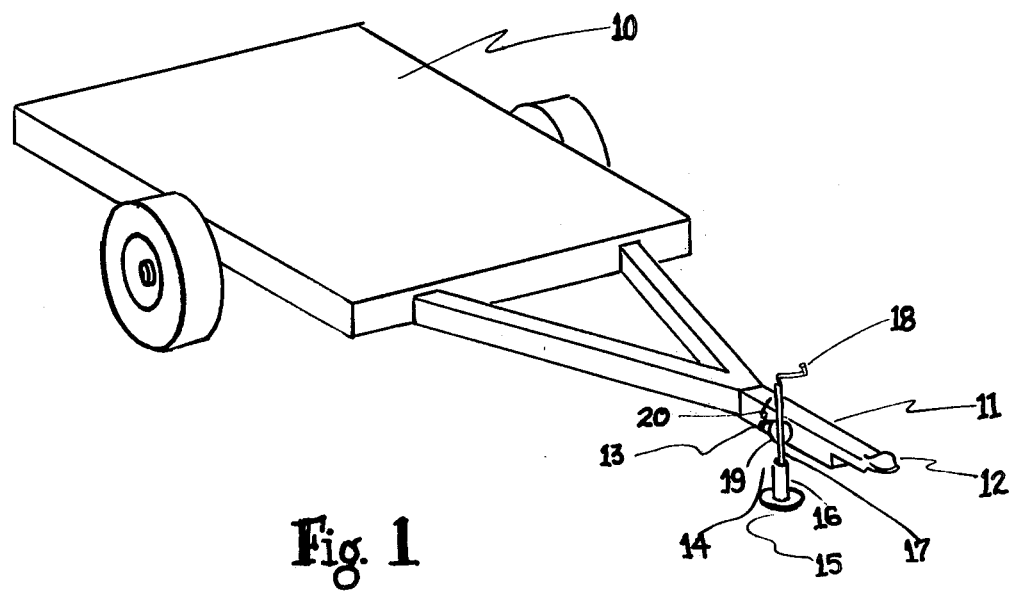
FIG. 1 is a perspective view of a trailer and tongue with the jack assembly of the present invention.

Referring by numerals to the accompanying drawings which illustrate a preferred embodiment of the device, in FIG. 1 a partial view of a trailer 10 is shown with tongue 11 with suitable means 12 for fixing the tongue to a towing vehicle. Affixed to the side of the tongue 11 is jack assembly 13 with screwjack 14 mounted thereon. The screwjack 14 has a ground engaging portion 15 with lower member 16 affixed thereto and slidably mounted inside of upper lifting member 17. Member 17 is telescoped out of member 16 upon rotating handle 18 in a clockwise direction by means of an internal screwthread not shown.

Once the towing vehicle has positioned the trailer 10 in an appropriate position for parking, the hitch assembly 12 can be lifted free of the hitch on the towing vehicle by placing the jack 14 in the vertical position shown in FIG. 1 and turning the handle 18 in a clockwise direction until ground engaging portion 15 contacts the earth. Continued rotation of the handle 18 in a clockwise direction will lift the tongue and the hitch assembly 12 free of the towing vehicle, allowing the towing vehicle to be moved away without the trailer tongue dropping to the ground.

The normal procedure is to reverse the aforesaid process when rehooking the trailer to the towing vehicle in preparation for towing the trailer to a new location. However, it is not uncommon for the operator to forget to rotate the handle in a full, counter-clockwise direction so as to retract the ground engaging portion 15. Accordingly, when the operator drives the vehicle forward, the ground engaging portion 15 contacts the earth, and usually at some point forcefully contacts a portion of the ground which causes one or both of members 16 and 17 to be forceably bent. Since the members 16 and 17 are usually of a tubular construction, once they are bent they are virtually impossible to straighten so as to function effectively. This will usually necessitate the purchase of a new jack and entail the additional cost of reinstalling the unit on the tongue.

The assembly of the present invention provides means for causing the jack to swing away once sufficient forces are experienced at the ground engaging portion 15. The jack 14 is fixed to a heavy disc member 19 which has at least one rounded notch located along the rim thereof. This notch in cooperation with pressure latch 20 provides a detent function so as to hold the jack firmly into a vertical position until a predetermined quantity of rotational force is applied, thereby causing the smooth edged notch to slide out from under the pressure latch allowing the disc 19 to rotate until the ground engaging portion 15 clears the ground.

Figure 2:
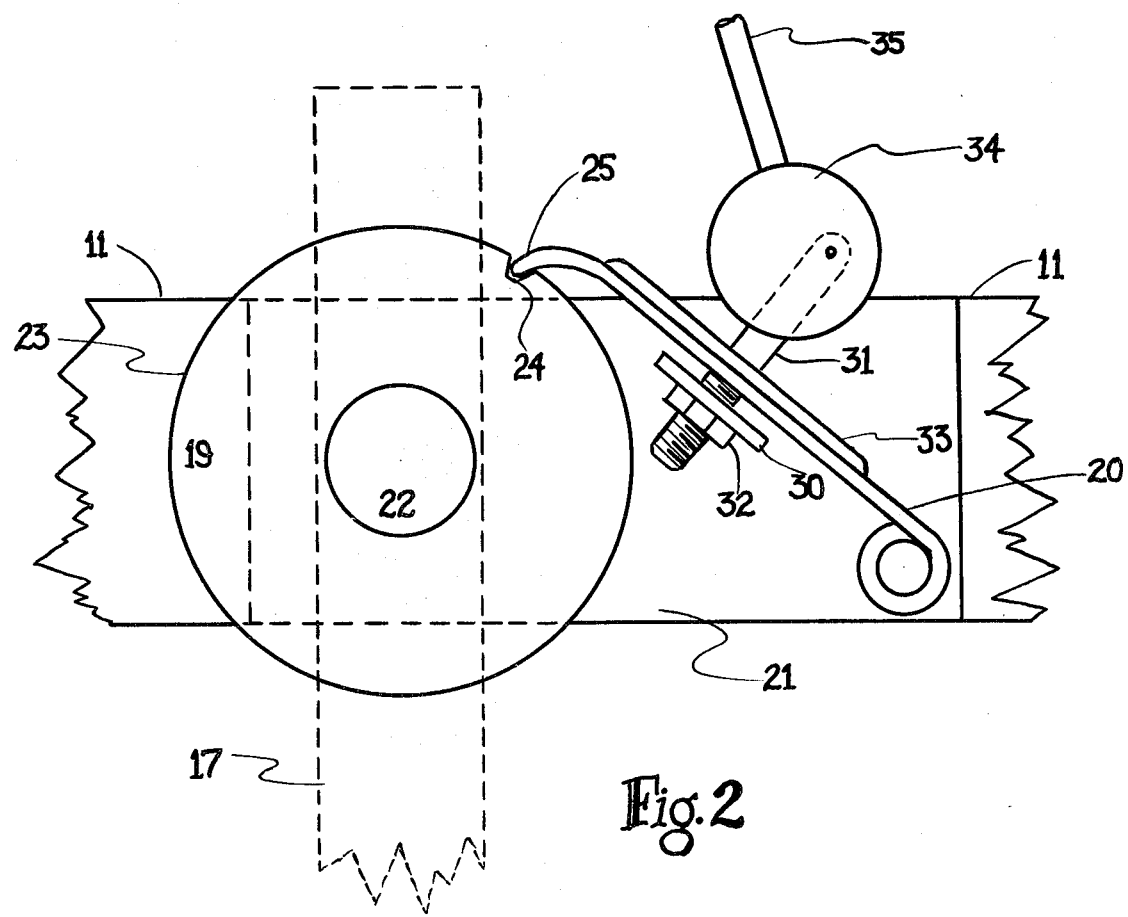
FIG. 2 is a side elevation view of the jack assembly.

Referring now to FIG. 2 where the device of the present invention is shown in greater detail, base plate member 21 is affixed to the side of tongue 11 shown in cut-away configuration. Rigidly affixed to plate 21 is axle portion 22. Disc member 19 having a central hole slightly larger than the diameter of axle 20 is mounted on said axle. Appropriate means, such as, a key or snap ring are used to hold the disc 19 onto the axle 22. The rim 23 of the disc contains a notch 24. The tip portion 25 of pressure latch 20 engages notch 24 thereby inhibiting the rotation of disc 19. The opposite end of the pressure latch is firmly affixed to the base plate 21 by welding or bolt mounting. In order to adjust the degree of pressure applied by tip portion 25 to notch 24, a tension adjusting assembly is provided. Flange 30 is welded or otherwise fixed to plate 21 and has a hole therein to accommodate a screwthread 31 and tension adjusting nut 32. In order to provide additional stiffness to the pressure latch, backup stiffener 33 is positioned along the upper surface of pressure latch 20. The upper end of screwthread 31 can be attached by a bolt, however, it is preferable to provide the upper end with a releasing cam 34, having handle 35 affixed thereto. In this configuration the upper end of screwthread 31 is affixed to the cam at an off-center point so that the handle in the down position towards the pressure latch will exert the greatest force against the back side of backup plate 33. By this arrangement the operator can pull up on handle 35 thereby releasing the pressure on the pressure latch and, in turn, releasing the pressure applied by tip portion 25 to notch 24. The operator can then swing the jack away from the vertical position to a substantially horizontal position, member 17 shown in outline.

However, if the operator forgets to move the jack into a horizontal position and leaves the jack in a vertical position while towing the trailer with a towing vehicle, the jack 14 will not be damaged. The force of the ground against the ground engaging portion of the jack will apply considerable rotational force to disc 23, and at a predetermined point the force will be sufficient to cause the tip portion 25 of the pressure latch to ride up over the smooth edge notch 24, causing the tip portion 25 to ride along the rim 23 until the ground engaging portion has been substantially lifted from the ground.

Depending upon the strength of the jack, which is a function of its thickness, design and materials, the tension adjusting nut 32 can be adjusted to accommodate all sizes and types of jacks. If a jack is of smaller cross-section and unable to withstand great bending moments, the tension adjusting nut 32 will be backed off of the screwthread so as to relieve the pressure on the pressure latch 20. For stronger jacks the tension adjusting nut 32 can be tightened accordingly.

Figure 3:
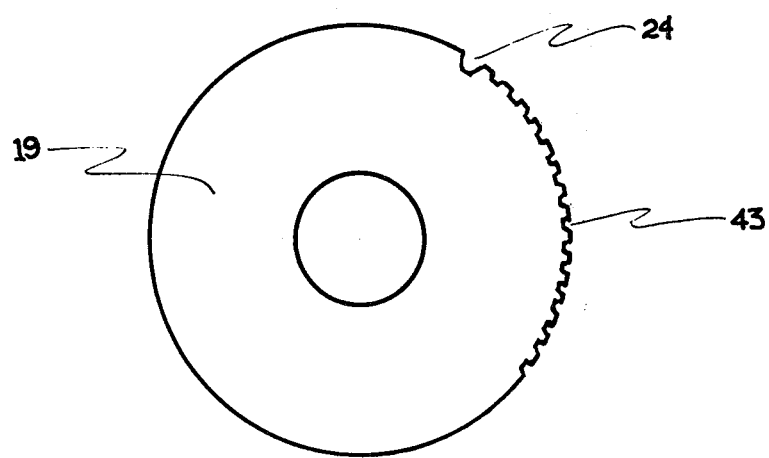
FIG. 3 is a side elevation view of an alternative disc mechanism.

Although a screwjack has been shown in the aforesaid embodiment, it is to be understood that other jacks, such as, a ratchet jack and hydraulic jack can likewise be used by affixing the lifting head of such jack to disc 19. As shown in FIG. 3, the disc member 19 can be provided with a saw tooth edge 43 clockwise of notch 24. This will cause the tip portion 25 to hold the jack firmly in position once it is in a raised position. Moreover, in the event the operator should inadvertently leave the jack down while driving off, the ground engaging portion 15 will not continually drag across the hard surface and eventually wear down but instead will at some point be kicked up by hitting some high point on the ground, thereby causing the disc to rotate an additional amount and to be held in that position by tip portion 25 engaging one of the saw tooth edges. As a rule, this will cause the ground engaging portion to remain free of the ground during further travel, thereby avoiding the wearing down of the ground engaging portion 15.

Although there has been shown and described a particular embodiment of this invention, it will be obvious to those skilled in the art that various changes and modifications may be made therein without departing from the invention. For example, the disc 19 can be provided with a plurality of smooth edge notches 24 and the plurality of pressure latches 20 with tip portions 25 engaging said notches so as to require a much greater rotational force to cause the tip portions to slide out of the notches. Such a system would be useful in very heavy duty applications. Moreover, a partial disc may be used since only ninety degrees of the circumference articulates with the tip portion of the pressure latch. A further modification would be to provide the disc with an offcenter perforation so that as the edge rotates under the tip the disc radius is increased, thereby tending to hold the jack assembly off the ground. Accordingly, it is understood that it is not desired to limit the invention to the exact details of the construction and operation of the precise self-releasing jack assembly herein specifically shown and described, for various modifications within the scope of the appended claims may occur to persons skilled in the art.

I claim:

1. In combination, a draft tongue of a towable vehicle and a rotatable support assembly comprising:
    a mounting plate having a vertical surface in a plane substantially parallel to the direction of movement of said towable vehicle in normal travel;
    an adjustable jack assembly having a ground engaging portion and a lifting head portion;
    means for providing rotation about an axis, the plane of rotation being substantially parallel to the aforesaid plane of the mounting plate, said means being comprised of an axle affixed with the axis thereof normal to said mounting plate and a centrally perforated disc rotatably mounted on said axle, said disc having a predetermined thickness and an edge surface along the circumference thereof;
    means for affixing said lifting head portion to said means for providing rotation about an axis; and
    means for inhibiting the rotation of said means for providing rotation about an axis and the jack assembly affixed thereto until rotational forces reach a predetermined level
    said means being a detent mechanism comprised of at least one notch on the surface of said disc and a means for engaging said notch which automatically leaves the notch when said rotational forces reach said predetermined level thereby allowing the jack assembly to rotate about said axle.

2. A combination as in claim 1 wherein said means for engaging said notch is a leaf spring with one end fixed to said mounting plate and the other end having a tip portion which engages said notch.

3. A combination as in claim 2 wherein means are provided to adjust the pressure of the tip portion of leaf spring against said notch.

4. A combination as in claim 2 wherein the mounting plate is a portion of said draft tongue.

5. A combination as in claim 2 wherein the relative position between the ground engaging member and the lifting head portion of the jack assembly is changed by the mechanical advantage of a screw mechanism.

* * * * *